United States Patent
Kuwata et al.

(10) Patent No.: US 7,552,615 B2
(45) Date of Patent: Jun. 30, 2009

(54) FAILURE DETECTION DEVICE FOR ROTATION ANGLE DETECTION SENSOR

(75) Inventors: Masayaki Kuwata, Anjo (JP); Toru Niinomi, Anjo (JP); Katsutoshi Komatsu, Anjo (JP); Masao Saitou, Anjo (JP); Kenji Suzuki, Anjo (JP); Tomokazu Nomura, Anjo (JP)

(73) Assignee: Aisin A W Co., Ltd. (JP)

( * ) Notice: Subject to any disclaimer, the term of this patent is extended or adjusted under 35 U.S.C. 154(b) by 475 days.

(21) Appl. No.: 11/441,015

(22) Filed: May 26, 2006

(65) Prior Publication Data

US 2006/0207310 A1 Sep. 21, 2006

Related U.S. Application Data

(62) Division of application No. 10/828,505, filed on Apr. 21, 2004, now abandoned.

(30) Foreign Application Priority Data

Apr. 23, 2003 (JP) .............................. 2003-118086

(51) Int. Cl.
*G01C 17/38* (2006.01)
(52) U.S. Cl. ....................................... 73/1.75
(58) Field of Classification Search ........................ None
See application file for complete search history.

(56) References Cited

U.S. PATENT DOCUMENTS

| 4,465,162 | A | * | 8/1984 | Yokota | 187/277 |
| 4,700,563 | A | * | 10/1987 | Iwata et al. | 73/115.02 |
| 5,136,880 | A | | 8/1992 | Norgauer | 73/117.3 |
| 5,260,877 | A | | 11/1993 | Drobny et al. | 364/431.11 |
| 5,608,317 | A | | 3/1997 | Hollman | 324/207.2 |
| 5,846,160 | A | | 12/1998 | Tuday | 477/99 |
| 6,191,579 | B1 | * | 2/2001 | Striker | 324/207.25 |
| 6,278,389 | B1 | | 8/2001 | Lochmann et al. | 341/118 |
| 6,736,756 | B2 | * | 5/2004 | Kwon | 477/98 |
| 2001/0009366 | A1 | | 7/2001 | Kono et al. | 324/207.2 |
| 2001/0020575 | A1 | | 9/2001 | Sato et al. | 200/61.88 |
| 2002/0040531 | A1 | | 4/2002 | Schodlbauer | 33/1 |

FOREIGN PATENT DOCUMENTS

| DE | 19712869 | 10/1998 |
| JP | 47-36170 | 11/1972 |
| JP | 03-073807 | 3/1991 |
| JP | 2001-174212 | 6/2001 |
| WO | WO 03098155 | 11/2003 |

* cited by examiner

*Primary Examiner*—Robert R Raevis
(74) *Attorney, Agent, or Firm*—Bacon & Thomas, PLLC (57) ABSTRACT

A failure detection device for detecting a failure of a rotation angle detection sensor, which sensor detects a rotational angle through which a rotary member has rotated, the failure detection device including a first detection element which has an output which increases as the rotational angle of the rotary member increases, a second detection element which has an output that decreases as the rotational angle of the rotary member increases, and a detecting unit that detects the failure of either the first detection element or the second detection element by comparing a calculated value, based on the outputs of both of the first and second detection elements, with at least one predetermined value.

5 Claims, 5 Drawing Sheets

FAILURE DETECTION DEVICE FOR ROTATION ANGLE DETECTION SENSOR

INCORPORATION BY REFERENCE

The disclosure of Japanese Patent Application No. 2003-118086 filed on Apr. 23, 2003, including the specification, drawings, and claims is incorporated herein by reference in its entirety.

CROSS-REFERENCE TO RELATED APPLICATION

The priority of Japanese Application No. 2003-118086 is claimed under 35 USC 119.

BACKGROUND OF THE INVENTION

1. Field of Invention

This invention relates to a failure detection device for detecting failure of a rotation angle detection sensor, which sensor detects the angular position of a rotatable member.

2. Description of Related Art

Conventionally, in a vehicle where shift control is performed by an A/T (Automatic Transmission) or a CVT (Continuously Variable Transmission), when a range is selected by operation of a shift lever, an electronic control unit (ECU) for the transmission responds by controlling solenoids, for example, utilizing a shifting logic for the selected range, and thereby executes the shift control. In such shift control, an angle of rotation of an element which rotates with movement of a shift lever is detected by a rotational position sensor, and on the basis of the output signal of the sensor, the ECU determines and confirms the selected range.

Conventional rotational position sensors include a non-contact type position sensor which detects without contact, the rotation angle of a movable-side terminal attached to a manual shaft rotated by a shift lever. The movable-side terminal is rotated together with the manual shaft, and its angle of rotation is detected and a voltage corresponding to the rotational angle is output by the non-contact sensor.

The ECU compares the output value from the non-contact type position sensor with a predetermined value (i.e. a threshold value) for each range, which predetermined value is set in advance and consists of a voltage value. Then, the ECU recognizes the pattern of the range and thus determines the selected range. Such a non-contact type rotational position sensor can generate stable output over the long term because there is little abrasion. (See, for example, U.S. Pat. No. 5,846,160.)

Non-contact type rotational position sensors are also used in other automotive applications. One example is a non-contact type throttle-opening sensor for detecting throttle opening, i.e. angle of rotation of a throttle valve in an internal combustion engine. The non-contact type throttle-opening sensor includes two Hall effect transistors as detection elements ("detectors"). These two Hall effect transistors have input-output characteristics with different absolute values for inclination of a linear output. If the relationship of the output voltages of the two Hall effect transistors is outside of a predetermined range for error in a map, it is determined that one of the Hall effect transistors has failed.

Also, if output voltage from a Hall effect transistor is outside of a predetermined tolerance range, it is determined that this detection element has failed. In the same manner, if output voltage from the other detection element is outside of a predetermined tolerance range, it is determined that this transistor has failed. Further, if a Hall effect transistor has failed, driving control of a throttle valve is performed with output voltage of the other normally operating Hall effect transistor. See, for example, Japanese laid open patent application number 2001-174212.

SUMMARY OF THE INVENTION

With the non-contact type rotational position ("angular position") sensors used in a transmission, as disclosed in the aforementioned U.S. Pat. No. 5,846,160, there is the possibility that even when the movable-side terminal rotates with rotation of the manual shaft, the voltage corresponding to the rotational angle of the movable-side terminal may not change, i.e. a "sticking failure." If such a failure occurs, the ECU can not correctly determine the selected range and accurate shift control of the transmission becomes difficult. However, in a transmission using the conventional non-contact type position sensor, such a failure will not occur.

Further, control in an automatic transmission involves control of a shift from a present position (i.e. range) to another position. It is required that a failure, for example failure of an angular position sensor, should be detected while shifting from a present position to another position. However, the non-contact type angular position sensor, disclosed in the aforementioned Japanese laid open patent, is applied as a throttle opening sensor in an engine, not in control of an automatic transmission.

Accordingly, one object of the present invention is to provide a failure detection device for an angular position sensor, which can assure detection of a failure, for example, failure of a detection element for detecting a rotational angle and to also assure accurate control of failure detection.

Another object of the invention is to provide a failure detection device for an angular position sensor, with a simplified logic for detecting the failure and for accurate control of the failure detection.

Thus, the present invention provides a failure detection device for detecting a failure of an angular position sensor, the failure detection device comprising: a first detection element, which has an output which increases as the rotational angle of a rotary member increases; a second detection element, which has an output which decreases as the rotational angle of the rotary member increases; detecting means for detecting failure of either the first detection element or the second detection element, wherein the detecting means compares a value calculated from the outputs of both of the first and second detection elements with a predetermined value set in advance, and thereby determines a failure of either the first detection element or the second detection element.

In another embodiment the present invention provides a failure detection device for detecting a failure of an angular position sensor, which detects the rotational angle of a rotary member, the failure detection device comprising: a first detection element; a second detection element; detecting means for detecting the failure of either the first detection element or the second detection element, wherein the detecting means determines that one of the first and second detection elements has failed if output of the one detection element does not change while output of the other detection element is changing.

BRIEF DESCRIPTION OF THE DRAWINGS

Embodiments of the present invention will now be described with reference to the drawings, wherein.

DETAILED DESCRIPTION OF PREFERRED EMBODIMENTS

Figure 1A:
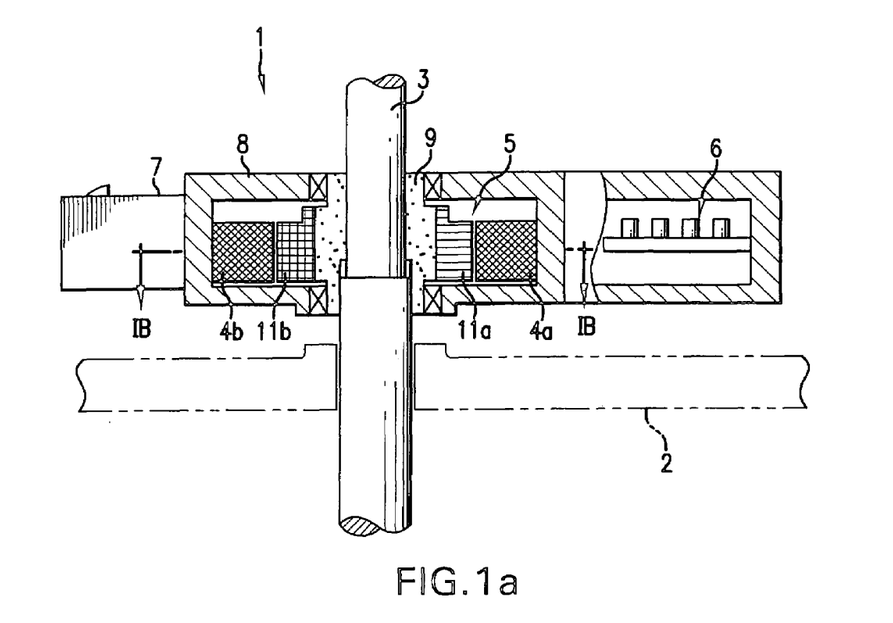
FIG. 1(a) and FIG. 1(b) are diagrams of a failure detection device for an angular position sensor, applied to an automatic transmission, according to a first embodiment of the invention.
Figure 1B:
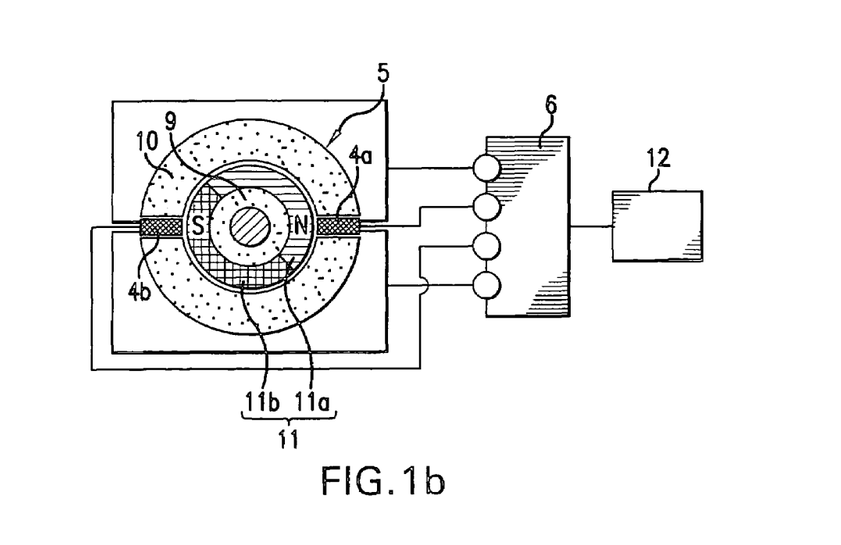

FIG. 1(a) is a diagram of a failure detection device for an angular position sensor, applied to an automatic transmission, according to a first embodiment of the invention; and FIG. 1(b) is a sectional view along the line IB-IB in FIG. 1(a).

As shown in FIG. 1(a) and FIG. 1(b), in this first embodiment, a failure detection device 1 for an angular position (rotational angle) sensor is applied in an A/T (automatic transmission). The position sensor failure detection device 1 is attached to a manual shaft 3 external to A/T case 2. The position sensor failure detection device 1 comprises angular position sensor 5 including first and second Hall effect transistors 4a and 4b as detection elements, an electronic control unit 6 (ECU, corresponding to a control unit in the embodiment of the invention) for controlling the A/T, A/T solenoids controlled by the ECU 6, a connecter 7 including plural terminals for connecting to plural controlled devices (i.e. an engine, an indicator), and an ECU case 8.

The angular position sensor 5 further comprises an annular internal core 9, made of soft magnetic material and fixed to the manual shaft 3, and an annular external core 10, made of soft magnetic material and fixed, concentric with the internal core 9, to the ECU case 8. An annular magnet 11 is fixed around the outer circumference of the internal core 9 and the internal core 9 and the magnet 11 are rotating together with the manual shaft 3. The external core 10 includes a pair of cores 10a, 10b, each of which has a semicircle shape, and these cores 10a, 10b are arranged so that the ends of the cores 10a, 10b face each other across a predetermined space. Within this predetermined space, the aforementioned first and second Hall effect transistors ("detection elements") 4a, 4b are respectively disposed.

A N-pole portion 11a of the magnet 11 faces the first detection element 4a and a S-pole portion faces the second detection element 4b. Thus, the N-pole portion 11a of the magnet 11 and the first detection element 4a form a first position sensor and the S-pole portion 11b of the magnet 11 and the second detection element 4b form a second position sensor in this first embodiment of the invention.

The first and the second detection elements 4a, 4b of the position sensor 5 and the ECU 6 are disposed inside of the ECU case 8 and are electrically connected with each other, whereby the ECU 6 is integrated with the position sensor 5. Alternatively, the position sensor 5 and the ECU 6 can be separate from each other, not integrated in the ECU case 8, and be electrically connected with each other. The connector 7 is attached to the ECU case 8 and is electrically connected to the ECU 6. The ECU for the A/T is connected to the ECU for the engine.

Although not shown in the drawing, the manual shaft 3 is connected to a shift lever through, for example, a lever and a wire external to the A/T case 2, and is further connected to a spool of a manual valve inside of the A/T case 2.

The position sensor 5 is a non-contact type position sensor, wherein magnet 11 does not contact either the first or second detection element 4a, 4b. The first and second detection elements 4a, 4b continuously output, respectively, the first sensor voltage value and the second sensor voltage value as shift position detection signals, on the basis of the degree of rotation, i.e., rotational angle, of N-pole portion 11a and S-pole portion 11b of the magnet 11, corresponding respectively to the first and second detection elements 4a, 4b.

Figure 2:
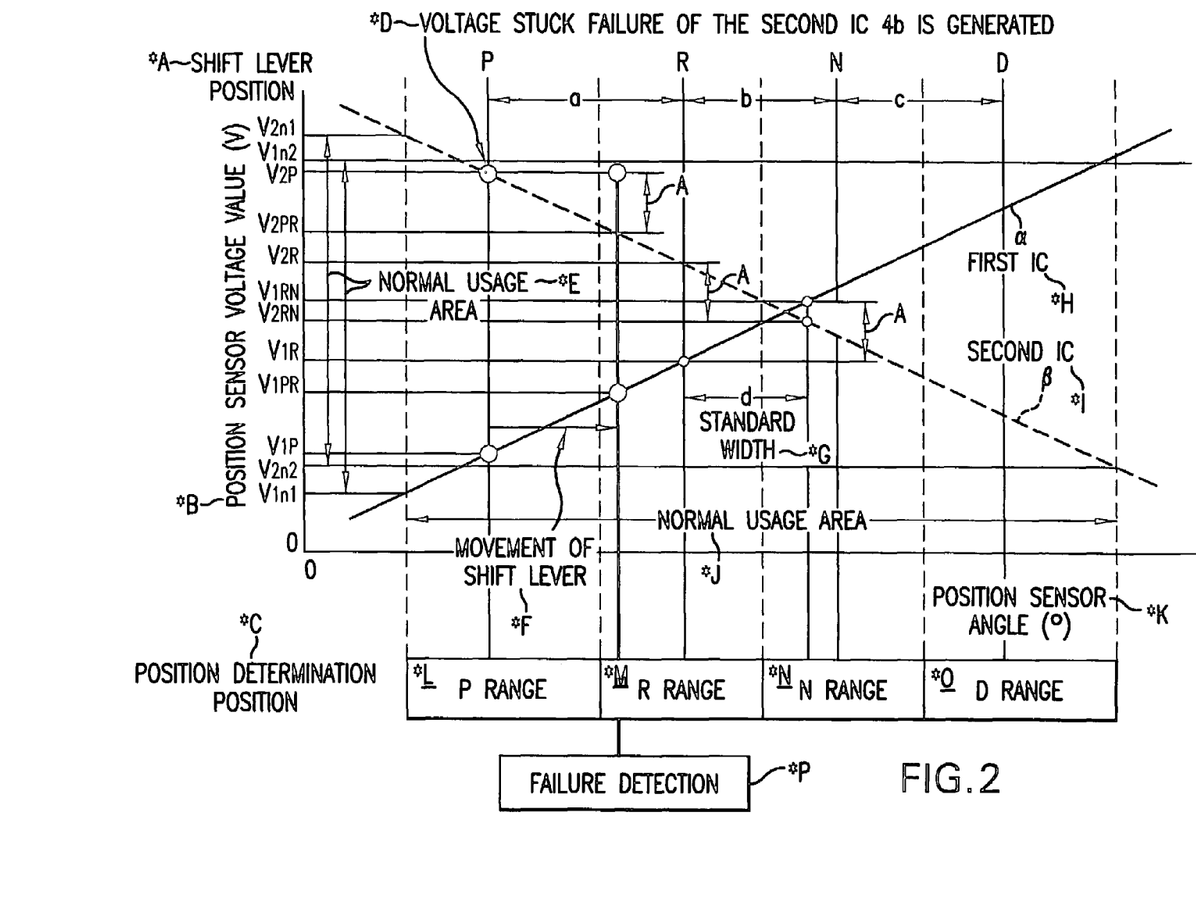
FIG. 2 is a graph explaining failure detection of an angular position sensor using two Hall effect transistors as detection elements as the failure detection device shown in the FIG. 1.

As shown by a solid line α in FIG. 2, the first detection element 4a has linear input-output characteristics. That is, the first sensor output voltage (V) continuously increases linearly with increase of the input-side position sensor angle (i.e. rotational angle of the N-pole detection element 4a). Also, the first sensor output voltage continuously decreases linearly with decrease of the input-side sensor positional angle. On the other hand, as shown by a dotted line β in FIG. 2, the second detection element 4b has characteristics the opposite of those of the first detection element 4a. That is, the second sensor output voltage (V) continuously decreases linearly with the increase of the input-side sensor position angle (i.e. rotational angle of the S-pole detection element 4b). Also, the second sensor output voltage continuously increases linearly with decrease of the input-side sensed angular position. In this example, the absolute values of inclination of the linear input-output characteristics of the first and second detection elements 4a and 4b are equal. Alternatively, as long as the first and second detection elements 4a and 4b have linear input-output characteristics with opposite inclination, the absolute values for inclination can be set differently. In this first embodiment, the absolute values for inclination are set equal as shown in FIG. 2.

The automatic transmission, to which the position sensor failure detection device 1 of this embodiment is applied, has four ranges, such as a parking range (P range), a reverse range (R range), a neutral range (N range), a drive range (D range). Other ranges, such as a fourth-speed range, a third-speed range, a second-speed range, can also be provided. This first embodiment will be described with reference to an A/T having the aforementioned four ranges.

For the angular position corresponding to each range P, R, N, and D, a voltage value (V) is set. FIG. 2 shows the angular position for each shift area delineated by vertical dotted lines. Also, FIG. 2 shows the angular position for each range, as set in the A/T, as vertical solid lines, and shows voltage values corresponding to these ranges of angular position. For example, the sensor voltage value for the P range is set as $V_{1P}$ (V) for the first detection element 4a and as $V_{2P}$ (V) for the second detection element 4b. Also, the sensor voltage value for the R range is set as $V_{1R}$ (V) for the first detection element 4a and as $V_{2R}$ (V) for the second detection element 4b. Further, the position sensor voltage values for the N range and D range are set on the basis of the lines α, β in the same way. By detecting the angular position, the selected range is determined.

A normal usage area for the first and second detection elements 4a, 4b is set as a range of angular positions extending from the shift start of the P range to the shift completion of the D range. When detected as a voltage value, the normal usage area of the first detection element 4a is between $V_{1n1}$ (V) and $V_{1n2}$ (V) and the normal usage area for the second detection element 4b is between $V_{2n1}$ (V) and $V_{2n2}$ (V).

Further, in this embodiment, an angular position range "a" (i.e. a range interval) is set between the P range and the R range, set as "b" between the R range and the N range, and set as "c" between the N range and the D range. In this embodiment, the sizes of these ranges are set as b<c<a. However, the size of the interval for each pair of adjacent ranges is not limited to the foregoing relationship and can be optionally set.

Figure 3:
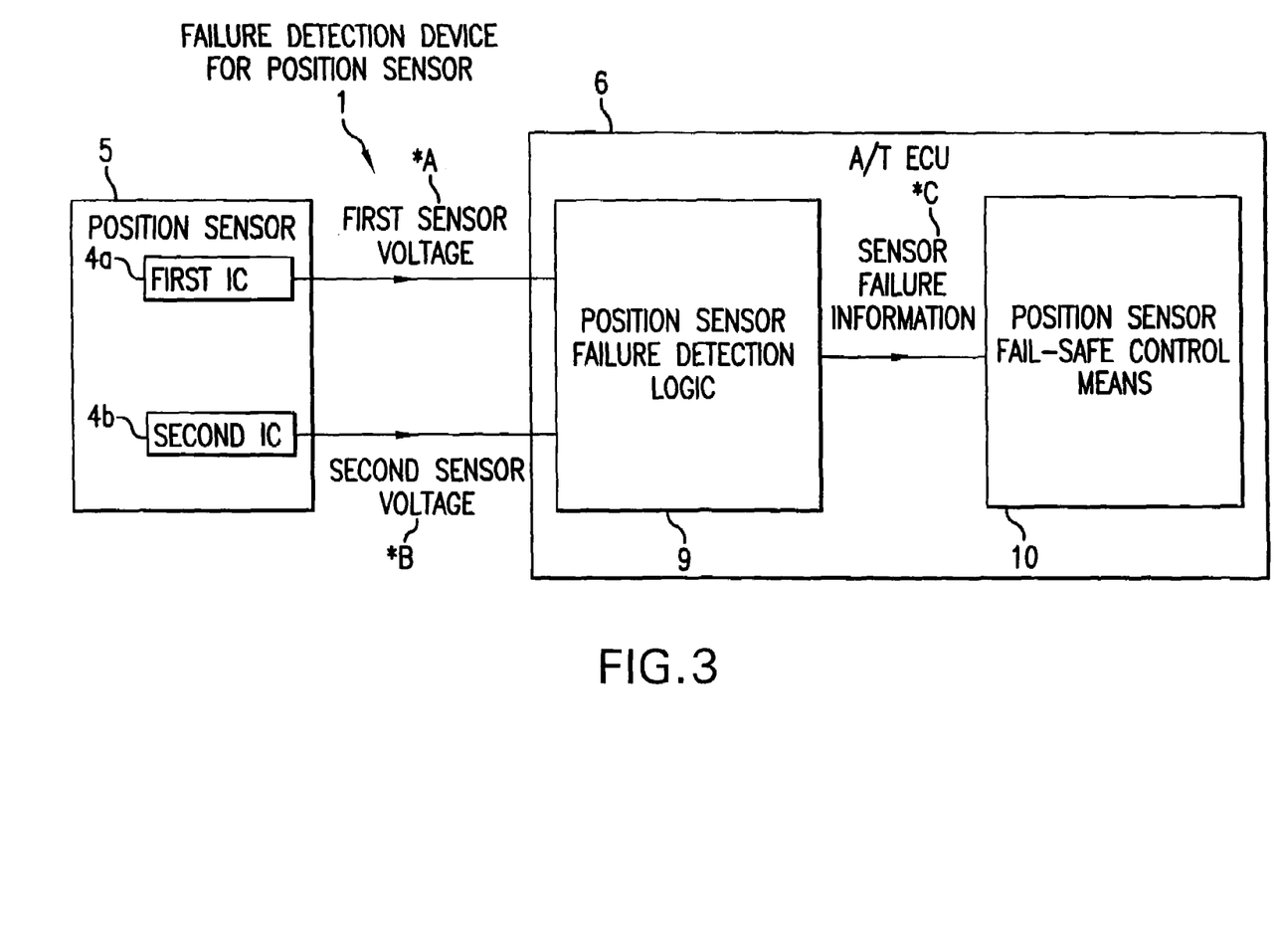
FIG. 3 is a block diagram of the failure detection device for an angular position sensor, shown in FIG. 1.

As shown in FIG. 3, the ECU 6 includes position sensor failure detection logic 9 and a position sensor fail-safe control unit 10. The position sensor failure detection logic 9 detects a sticking failure of the position sensor. In this sticking failure detection logic, a sticking failure of either the first or second detection element 4a or 4b is determined and detected on the basis of total of the sensor voltage values, output from the first and second detection elements 4a, 4b. Specifically, if the absolute value of the difference between (1) the total value of the output voltages from the first and second detection elements 4a and 4b and (2) a total value of the output voltages from the first and second detection elements 4a and 4b indicative of normal operation, becomes larger than a predetermined value, a sticking failure of one of the first or the second detection elements 4a and 4b is detected. Further, in a shift from one range to an adjacent range, the ECU 6 detects a sticking failure before the adjacent range is determined and outputs a signal indicating sensor failure to the position sensor fail-safe control unit 10.

The above-mentioned predetermined value for the determination of a sticking failure is set as follows. At first, a standard range for the angle detected by the angular position sensor, to be taken as detection of a sticking failure, is set on the basis of the smallest angle (i.e. narrowest width) between ranges. In this embodiment, the smallest angle or interval between ranges is that between the R range and the N range, shown as d, and as being smaller than the angle interval b, in FIG. 2. In this way, by setting the standard equal to d for detection of sticking failure, sticking failure for each interval between ranges, in shifting from one range to an adjacent range, can be detected before the adjacent range is reached.

Next, a sensor output voltage corresponding to the standard interval d is determined. In the first detection element 4a, the value for sensor output voltage is determined as $V_{1RN}-V_{1R}=A$, and this value A is set as a first predetermined value for determination of sticking failure of the first detection element 4a. Also, for the second detection element 4b, the value for the sensor output voltage is obtained by $V_{2R}-V_{2RN}=A$, and this value A is set as a second predetermined value for determination of sticking failure of the second detection element 4b. In this embodiment, as the absolute values for inclination of the input-output characteristics of the first and second transistors 4a and 4b are set equal, the first and second predetermined values are equal to A both in the direction of increase in the sensed position angle and in the direction of decrease in the sensed position angle. (Hereinafter, this "A" is referred to as "predetermined value A"). On the other hand, when the absolute values of inclination of the input-output characteristics of the first and second detection elements 4a and 4b are set differently, the first and second predetermined values are set differently as described later.

A sticking failure of the angular position sensor by the position sensor failure detection logic 9, using the predetermined value A set as described above, will now be explained. In FIG. 2, suppose that the shift lever is set for the P range. In this situation, the sensor voltage values for the first and second detection elements 4a and 4b are, respectively, $V_{1P}$ and $V_{2P}$. The total value is $V_{1P}+V_{2P}$. In moving the shift lever from the P range toward the R range, the manual shaft 3 is rotated and thus rotary elements 11a, 11b are rotated together with the manual shaft 3. With the rotation of these sensors, the output voltage from the first detection element 4a increases linearly along the solid line α in FIG. 2 while the output voltage from the second detection element 4b decreases linearly along the dotted line β in FIG. 2. If neither of the first and second detection elements 4a, 4b has a sticking failure, and each is operating normally, while shifting from the P range to the R range, the total value of the sensor output voltages of detection elements 4a, 4b, is $V_{1PR}+V_{2PR}$. As the inclinations of the input-output characteristics of the detection elements 4a and 4b are opposite each other, while the absolute values of their output voltages are the same, the output voltage of detection element 4b decreases by the same amount as the output voltage of detection element 4a increases. Therefore, the total value of the sensor output voltages does not change and the equation, $V_{1P}+V_{2P}=V_{1PR}+V_{2PR}$, is satisfied.

Then, when the shift lever is set at the R range and remains there, the value of the output voltage of the first detection element 4a becomes $V_{1R}$, the value of the output voltage of the second detection element 4b becomes $V_{2R}$, and the total value of the both sensor output voltages becomes $V_{1R}+V_{2R}$. Because the total value of the sensor output voltages does not change, the ECU 6 determines that $V_{1P}+V_{2P}=V_{1PR}+V_{2PR}=V_{1R}+V_{2R}$ and therefore does not detect the a sticking failure in the first detection element 4a or in the second detection element 4b. Thus, the ECU 6 determines selection of the R range and performs control for the R range as in a conventional A/T.

Also, when the shift lever is moved from the position for the R range to that for the N range, or from the N range to the D range, as long as the first and second detection elements 4a, 4b are operating normally, the output voltage of the first detection element 4a increases linearly, and that of the second detection element 4b decreases by the same amount as the increase in the value of the output voltage of the first detection element 4a. However, the total value of the output voltages of the first and second detection elements 4a, 4b does not change. On the other hand, in shifting from the D range to the N range, from the N range to the R range, or from the R range to the P range, that is, when a shift operation is performed in such a direction that the sensed angle decreases, the total of the sensor output voltages of the first and second detection elements 4a and 4b does not change, although the increase and decrease of the output voltages are the opposite of the aforementioned situation in which a shift is made in such a direction that the sensed angle increases. The ECU 6 determines other range selections in the same way, and performs control for the determined range as in the conventional A/T.

As shown in FIG. 2, for example, when the shift lever is moved from the P range toward the R range, i.e., in a direction by which the sensed angle increases, the rotary elements 11a, 11b of the first detection element 4a and the second detection element 4b rotate in the same way as described above. If a sticking failure occurs in the second detection element 4b at a position within the P range, the sensor voltage value of the first detection element 4a increases along the solid line α as described above. However, the output voltage of the second detection element 4b does not change (i.e. does not decrease), and remains $V_{2P}$. Therefore, the total value $V_{1PR}+V_{2P}$ of the sensor output voltages of the first and second detection elements 4a and 4b, increases by the amount $\{(V_{1PR}+V_{2P})-(V_{1PR}+V_{2PR})=V_{2P}-V_{2PR}\}$. As shown in FIG. 2, this increased amount, i.e., the difference between the total sensor output voltages of the first and the second detection elements 4a, 4b when the second detection element 4b has a sticking failure, and the total sensor output voltages of the first and the second detection elements 4a, 4b when operating normally, becomes positive. Therefore, the position sensor failure detection logic 9 compares the absolute value of this difference with the predetermined value A corresponding to the second detection element 4b. If the absolute value of this difference becomes larger than the predetermined value A, the position sensor failure detection logic 9 determines that a sticking failure has occurred in the second detection element 4b and outputs the thus determined sensor failure information to the position sensor fail-safe control unit 10.

As described above, before selection of the R range is determined by the ECU 6, the position sensor failure detection logic 9 detects a sticking failure of the second detection element 4b if such a failure has occured. This is because the predetermined value A, which is determined by the standard angular spacing d set based on the aforementioned smallest range spacing (i.e. interval between the R range and the N range), is used.

Also, in the same way, a sticking failure of the second detection element 4b is detected at the time of a shift operation that increases the position angle, from another range (other than the P range), to an adjacent range. Further, in the same way, sticking failure of the first detection element 4a, in a shift operation in which the position angle increases, can also be detected before the adjacent range is set. However, in this case, the difference between the total voltage output of both angular position sensors 4 and a total sensor voltage output value for both position sensors 4 in normal operation, becomes negative. Therefore, the predetermined value for detection of a sticking failure is the value A corresponding to the first detection element 4a.

Also, in the case of a shift in a direction that the positional angle decreases, a sticking failure in the first or second detection element 4a, 4b is detected before the adjacent range is determined. However, in this embodiment, the absolute value of the difference as mentioned above, and the predetermined value are compared. Therefore, a predetermined value corresponding to each of the first and the second detection elements 4a, 4b, like the case where the position sensor angle increases, is used as the predetermined value to detect a sticking failure of the first or the second detection element 4a, 4b.

When the aforementioned sensor failure information is input from the position sensor failure detection logic 9, the position sensor fail-safe control unit 10 executes a fail-safe control routine and prohibits setting of the next range for the A/T. In this situation, the sensor failure information is input before the next range is determined. Therefore, even if the next range is accidentally determined, control setting the next range for the A/T is reliably prevented.

In a control system of an automatic transmission (A/T), the output voltage of a sensor changes with factors such as temperature. Therefore, to reduce the effect of change in temperature, etc., a control system that limits sensor output voltage by execution of a software program for detection of sticking failure is employed only in an area where high sensor accuracy is required. For such a transmission control system, the aforementioned position sensor sticking failure detection device 1 can be applied. In this case, the aforementioned standard width d, as the predetermined value for detecting a failure, is set smaller, and a predetermined value B, which is set smaller than the aforementioned predetermined value A, is used. Of course, a predetermined value B is set corresponding to each of the first and second detection elements 4a, 4b.

Figure 4:
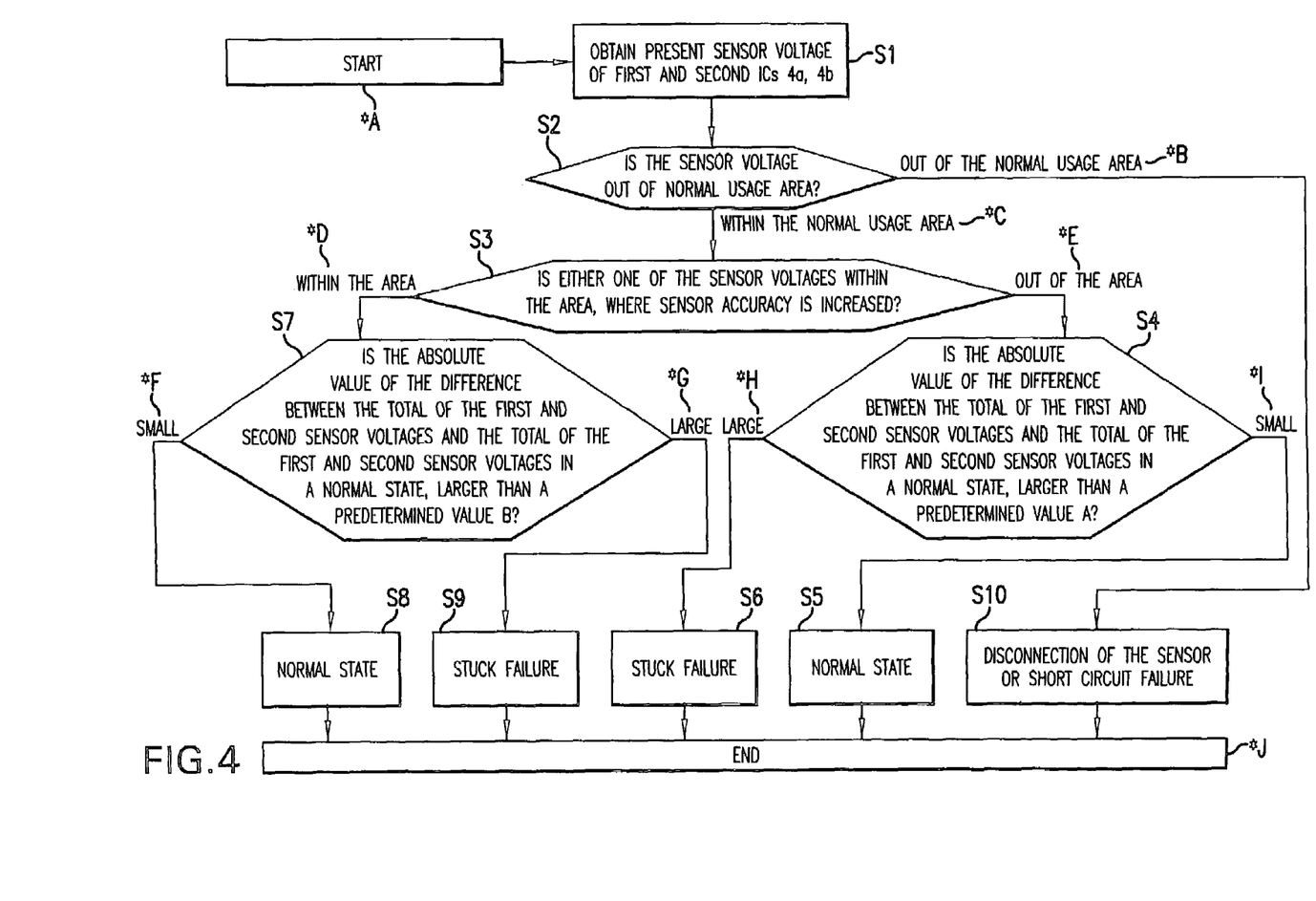
FIG. 4 is a flow chart of a routine for detection of failure of an angular position sensor.

FIG. 4 is a flow chart of a routine for detection of failure of the position sensor. As shown in FIG. 4, when execution of the failure detection starts, at step S1, present sensor output voltages of the first and second detection elements 4a, 4b are obtained. Next, at step S2, it is determined if each sensor voltage (values for both 4a and 4b) is within an area of normal operation (i.e., $V_{1n1}$ $V_{1n2}$ for the first detection element 4a and $V_{2n2}$ $V_{2n1}$ for the second detection element 4b). If it is determined that each sensor voltage is within the area of normal operation, it is determined, at step S3, if one of the sensor voltages is within an area in which increased sensor accuracy is required. If it is determined that both sensor voltages are outside of that area, it is determined, at step S4, if the absolute value of the difference between the total of the sensor voltages, i.e., voltage outputs of the first and second detection elements 4a, 4b, and the value of total sensor voltage in normal operation, is larger than the predetermined value A. If is determined that the absolute value of the difference is smaller than the predetermined value A, it is determined, at step S5, that both detection elements 4a, 4b, are operating normally, and the sticking failure detection routine ends.

If it is determined, at step S4, that the aforementioned difference is larger than the predetermined value A, a sticking failure or an oscillation failure of the position sensor is detected, at step S6, on the basis of whether the aforementioned difference is positive or negative and on the basis of direction of increase or decrease of the sensed position angle. Also, the position sensor which has failed is detected, and the sticking failure detection routine ends.

Also, if it is determined, at step S3, that one of the sensor voltages is within the area in which sensor accuracy is to be increased, it is determined, at step S7, if the absolute value of the difference between the total of voltage outputs of the first and second detection elements 4a, 4b, and the value for total voltage in normal operation, is larger than the predetermined value B. If is determined that the absolute value of the difference is smaller than the predetermined value B, it is determined, at step S8, that both detection elements 4a, 4b are operating normally and execution of the sticking failure detection routine ends.

If it is determined, at step S7, that the aforementioned difference is larger than the predetermined value B, a sticking failure or an oscillation failure of the position sensor is detected at step S9, on the basis of the positive or negative value of the aforementioned difference and the direction of the increase or decrease of the sensed position angle. Also, the position sensor which has failed is identified and the failure detection routine is ended. Further, if it is determined, at step S2, that each sensor voltage value is outside of the normal usage area, it is determined, at step S10, that the position sensor failure is other than a sticking failure, e.g., a failure such as disconnection of the sensor or a short circuit, and the sticking failure detection routine is ended.

According to the first embodiment, the absolute value of the difference between the total of the output voltages of the first and second detection elements 4a, 4b, which have characteristics of opposing inclinations and the total voltage outputs of the first and second detection elements 4a, 4b in normal operation, is compared with a predetermined value A or B. Therefore, as the total voltage for the first and second detection elements can be made different according to which position sensor has failed, the aforementioned difference can also be made different. Thus, a sticking failure of the first and second detection elements 4a, 4b can be reliably detected before a shift to the next range is determined.

Also, according to the first embodiment, the input-output characteristics of the first and second detection elements 4a, 4b have opposite linear inclinations and the absolute values of the inclinations are equal to each other. Therefore, the predetermined values for the first and second detection elements 4a, 4b can be set equal to each other. Thus, the control of the sticking failure detection can be performed more easily and more accurately.

Further, the predetermined values A, B are set on the basis of the smallest angle range (interval), between adjacent ranges, e.g., that between R and N range. Therefore, in any range, when a sticking failure occurs in the position sensor, that failure can be reliably detected before the next adjacent range is determined. Thus, for any range, when a sticking failure is detected before the next range is determined, some action to cope with the failure of the position sensor can be taken, such as fail-safe control prohibiting shift control for the A/T. In addition, erroneous determination by the ECU 6 of the range selected for the A/T is prevented.

Although, in the foregoing embodiment, the outputs of the first and second detection elements 4a, 4b are set with opposite inclinations and the same absolute value of inclination, the output can also be set with inclinations opposite from each other and different absolute values of inclination. In this case, the predetermined value, set in consideration of the accuracy needed for the first and second detection elements 4a, 4b, is used. For example, first predetermined values $A_1$ and $B_1$ are set corresponding to the first detection element 4a, and second predetermined values $A_2$ and $B_2$ are set corresponding to the second detection element 4b. Which predetermined value is selected is based on the direction of the increase or decrease of the sensed position angle, or whether the aforementioned difference is positive or negative.

Also, the predetermined value can also be selected based on rate of change of the total of voltage outputs of the first and second detected elements 4a, 4b. Further, a sticking failure can be detected by comparing the difference (i.e. subtracted value) of the first output voltage of the first detecting element 4a and the second output voltage of the second detection element 4b, and the predetermined value. That is, a sticking failure can also be detected by comparing the calculated value (such as, total value obtained by addition, subtracted value, multiplied value, divided value, etc.) of the first output voltage of the first detection element 4a and the second output voltage of the second detection element 4b, and the predetermined value, corresponding to the calculated value.

Figure 5:
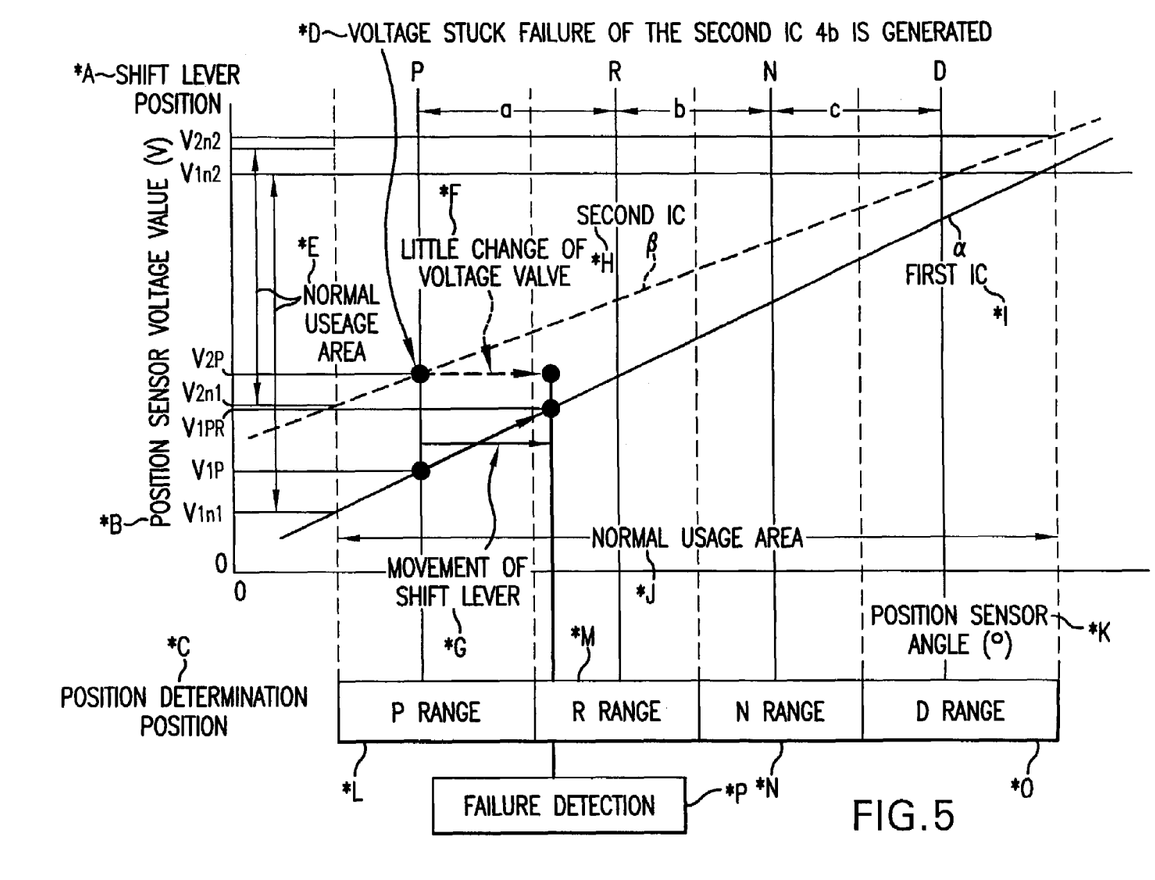
FIG. 5 is a graph for the other embodiment of the invention, explaining detection of failure of an angular position sensor, using two Hall effect transistors as detection elements.

FIG. 5 shows another embodiment of the invention, similar to that of FIG. 2. The same elements as in the previous embodiment are denoted by the same reference numerals and a detailed explanation is omitted for convenience of explanation. In the former embodiment, the inclinations of the input-output characteristics of the first and second detection elements 4a, 4b are in opposite directions and a sticking failure is detected by comparing the calculated value (such as, total of addition, subtracted value, multiplied value, divided value, etc.) of the first output voltage value of the first detection element 4a and the second output voltage value of the second detection element 4b, with the predetermined value corresponding to the calculated value. On the other hand, in the embodiment of FIG. 5, the sticking failure detection device 1 for the position sensor detects that while one sensor output voltage value, output from one of the first and second detection elements 4a, 4b, is changing the other output voltage, output from the other detection element, is hardly changing. In this manner, it can be detected that it is the other detection element which has failed.

For example, the sticking failure detection device 1 for the position sensor, shown in FIG. 5, includes the first and second detection elements 4a, 4b, having input-output characteristics with inclinations having the same direction and different absolute values. If the shift lever is moved toward the R range position while the second detection element 4b experiences a sticking failure, i.e., sticks in the P range position, the first output voltage of the first detection element 4a increases as the rotational angle of the sensed position increases as indicated by the thick solid arrow in FIG. 5. On the other hand, the second output voltage, output from the second detection element 4b in a state of failure, hardly changes as the sensed rotational angle increases, shown as a thick dashed arrow in FIG. 5. Thus, based on the fact that, although the first output voltage increases, the second output voltage hardly changes, a sticking failure of the second detection element 4b is decided by the A/T ECU 6.

As described above, this second embodiment operates without comparing the first and second output voltages, from the first and second detection elements 4a, 4b, with predetermined values. Instead, simply by detecting that one output voltage is changing, while the other sensor voltage value hardly changes, a sticking failure of the detection elements is easily and reliably determined. Therefore, a logic for comparing and calculating the sensor voltage outputs with predetermined values becomes unnecessary, and the logic can be simplified and the control for detecting a sticking failure can be made more accurate. Other structures and advantages of the sticking failure detection device in this second embodiment are same as those of the first embodiment.

As shown in FIG. 5, the inclinations of the input-output characteristics of the first and second detection elements 4a, 4b are in the same direction and have different absolute values. However, the invention is not so limited. For example, first and second detection elements 4a, 4b, having characteristics (output voltage verses angle of rotation) with inclinations in the same direction and the same absolute values can be used. Alternatively, the first and second detection elements 4a, 4b, can have characteristics with inclinations in opposite directions and the same or different absolute values.

Also, although in the embodiments described above an automatic transmission is used for purposes of explanation, the invention is not so limited. The invention can be applied to any device controlled by an ECU responsive to output voltage from a position sensor. For example, the invention can be applied to other types of transmissions, such as continuously variable transmissions (CVT). In addition, the setting for each range is also not limited to those of the aforementioned embodiments, and can be optionally set.

Further, the invention is not limited to a transmission, but can be applied to any type of rotary member. Also, the invention can be applied to the detection of failures other than the aforementioned sticking failure, as long as the output of the detection element of the rotation angle detection sensor changes from the normal state due to the failure.

One advantage of several embodiments of the invention is that a failure of the rotational angle detection sensor can be detected while the sensor is not moving, e.g., while the shift lever is not being moved.

Another possible advantage is as follows. Because the calculated value based on outputs from both of the first and second detection elements is compared with the predetermined value set in advance, and because the input-output characteristics of the first and second detection elements are linear with opposite inclinations, the calculated value will vary, depending on which detection element has failed, and the difference from the predetermined value will vary depending on which detection element has failed. Thus, a failure, such as sticking failure, of one of the first and second detection elements, can be readily detected and, in addition, the detection element which has failed can be easily identified. Therefore, the control of failure detection can be performed more accurately. Also, the failure, such as a sticking failure, can be detected while moving, e.g., a shift lever, from a present position (range) to the next position.

Further, as noted above, the absolute value of the difference between (1) the total of the outputs from the first and second detection elements and (2) the total of the outputs from the first and second detection sensors in normal operation, is compared with a predetermined value set in advance. Further, the input-output characteristics of the first and second detection elements are linear with opposite inclinations. Therefore, the total value of the outputs from the first and second detection elements will differ depending on which detection element has failed and the difference as compared to the predetermined value, depending on which detection element has failed. Thus, a failure, such as a sticking failure, of the first or second detection element can be reliably detected and, in addition, the detection element which has failed can be easily and reliably detected. Therefore, the control of detection of failure can be performed more accurately.

As also noted above, when the output of one of the first and second detection sensors changes, while the output of the other does not change, it is determined that the other detection element has failed. Thus, a failure, such as a sticking failure, of the first or second detection element can be reliably detected and, in addition, the detection element which has failed can be easily and reliably detected. Therefore, because the logic for calculating and comparing the output of the detection elements with the predetermined values becomes unnecessary, the logic for detection of failure can simplified, and control of failure detection can be performed more accurately.

Another advantage is that, because the input-output characteristics of the first and second detection elements are linear with opposite inclinations and the absolute values for inclinations are equal to each other, the first and second predetermined values can be set equal to each other, and the failure detection control can be further simplified and made yet more accurate.

Another possible advantage is that a failure, such as a sticking failure of a position sensor which detects the position of a shift operation member (e.g., shift lever) for setting the range of the transmission, can be detected. Therefore, erroneous determination of the range selected for the transmission by the ECU can also be prevented.

Another possible advantage is that, in a transmission wherein multiple ranges are set, the predetermined values may be set on the basis of the interval between adjacent ranges. Therefore, in a case when two ranges are set, a failure, such as a sticking failure of the position sensor, can be detected before the next adjacent range is determined. Thus, if the failure is detected before the next range is determined, some action for coping with the failure can be taken, e.g., fail-safe control prohibiting shift control of the transmission).

Another advantage is that the predetermined value is set on the basis of the smallest angular spacing between adjacent range angular positions. Thus, for any range, when a failure, such as a sticking failure occurs in the position sensor, the failure can be detected before the next adjacent range position is determined and remedial action, such as fail-safe control prohibiting execution of shift control for the transmission, can be taken.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A failure detection device for detecting a failure of a rotation angle detection sensor which detects a rotational angle of a shift operating member for establishing one of plural ranges in an automatic transmission, wherein the sensor includes a first detection element having an output which increases as the rotational angle increases and a second detection element having an output which decreases as the rotational angle increases, the failure detection device comprising:

detecting means for detecting a total of the outputs of the first and second detection elements, for determining a difference between the detected total of outputs and a total of the outputs of the first and second detection elements predetermined for normal operation of the first and second detection elements, and for detecting a failure of the sensor by comparing the determined difference with a predetermined value set on the basis of an angular interval between adjacent ranges included in the plural ranges.

2. The failure detecting device according to claim 1, wherein the detecting means detects a failure of the sensor by a determination that output of one of the detection elements does not change while output of the other detection element is changing.

3. The failure detecting device according to claim 2, wherein the plural ranges of the transmission include at least three ranges, and the predetermined value is set on the basis of the smallest angular interval between adjacent ranges included in the plural ranges.

4. The failure detecting device according to claim 1, wherein the plural ranges of the transmission include at least three ranges, and the predetermined value is set on the basis of the smallest angular interval between adjacent ranges included in the plural ranges.

5. The failure detecting device according to claim 1, wherein said outputs of the first and second detection elements are linear and have absolute values of inclination which are substantially equal.

* * * * *